(12) United States Patent
Levanen (10) Patent No.: US 11,664,867 B2
(45) Date of Patent: May 30, 2023

(54) COMPUTATION OF BEAMFORMING PARAMETERS

(71) Applicant: NOKIA SOLUTIONS AND NETWORKS OY, Espoo (FI)

(72) Inventor: Toni Aleksi Levanen, Tampere (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/960,450

(22) Filed: Oct. 5, 2022

(65) Prior Publication Data

US 2023/0106724 A1 Apr. 6, 2023

(30) Foreign Application Priority Data

Oct. 5, 2021 (FI) ...................................... 20216027

(51) Int. Cl.
*H04B 7/06* (2006.01)

(52) U.S. Cl.
CPC .................................. *H04B 7/0617* (2013.01)

(58) Field of Classification Search
CPC ................................................... H04B 7/0617
USPC ........................................................ 375/267
See application file for complete search history.

(56) References Cited

U.S. PATENT DOCUMENTS

| 7,099,630 | B2 | 8/2006 | Brunner et al. | |
|---|---|---|---|---|
| 9,094,990 | B2 * | 7/2015 | Morozov | ............. H04B 7/0417 |
| 2006/0094373 | A1 * | 5/2006 | Hottinen | ................ H04B 7/066 |
| | | | | 455/562.1 |
| 2007/0142089 | A1 | 6/2007 | Roy | |

FOREIGN PATENT DOCUMENTS

| WO | 2005/109680 A1 | 11/2005 |
|---|---|---|
| WO | 2020/076324 A1 | 4/2020 |
| WO | 2020/082244 A1 | 4/2020 |

OTHER PUBLICATIONS

Communication of Acceptance—section 29a of Patents Decree & Finnish Search Report dated May 4, 2022 corresponding to Finnish Patent Applicaton No. 20216027.

Extended European Search Report dated Feb. 8, 2023, corresponding to European Patent Application No. 22198224.2.

(Continued)

*Primary Examiner* — Fitwi Y Hailegiorgis
(74) *Attorney, Agent, or Firm* — Squire Patton Boggs (US) LLP (57) ABSTRACT

This document discloses a solution for computing beamforming coefficients for a radio channel between two apparatuses. According to an aspect, a method comprises: obtaining a channel matrix representing a radio channel between an apparatus and another apparatus; obtaining an initial eigenvector estimate for an eigenvector of the channel matrix; computing an intermediate eigenvector estimate based on the channel matrix and the initial eigenvector estimate; computing an error vector representing an error between the initial eigenvector estimate and the intermediate eigenvector estimate; computing a final eigenvector estimate based on the error vector and the intermediate eigenvector estimate; and determining beamforming coefficients based on the final eigenvector estimate and communicating with said another apparatus by using the beamforming coefficients.

20 Claims, 6 Drawing Sheets

(56) References Cited

OTHER PUBLICATIONS

D.D. Feldman et al: "A projection approach for robust adaptive beamforming", IEEE Transactions On Signal Processing, vol. 42, No. 4, Apr. 1, 1994 (Apr. 1, 1994), pp. 867-876.
Degroat R D et al: "Efficient numerically stabilized rank-one eigenstructure updating [signal processing]", IEEE Transactions On Acoustics, Speech and Signal Processing, IEEE Inc. New York, USA, vol. 38, No. 2, Feb. 1, 1990 (Feb. 1, 1990), pp. 301-316.
Lal C Godara: "Application of Antenna Arrays to Mobile Communications, Part II: Beam-Forming and Direction-of-Arrival Considerations", Proceedings of the IEEE, IEEE. New York, US, vol. 85, No. 8, Aug. 1, 1997 (Aug. 1, 1997), pp. 1195-1245.

* cited by examiner

Fig 8

COMPUTATION OF BEAMFORMING PARAMETERS

CROSS REFERENCE TO RELATED APPLICATION

This application claims the benefit of Finnish Patent Application No. 20216027, filed Oct. 5, 2021. The entire content of the above-referenced application is hereby incorporated by reference.

FIELD

The exemplary and non-limiting embodiments of the invention relate generally to communication systems. Embodiments of the invention relate especially to computing beamforming coefficients to realize spatial directivity towards a desired direction in wireless communications.

BACKGROUND

Beamforming is a fundamental part of modern radio communications, e.g. modern cellular communication systems such as the fourth generation (long-term evolution, LTE) and the fifth generation (New Radio, NR) systems. Efficient estimation of eigen beams to be used in transmission and reception beamforming is crucial to implement power-efficient and highly performing radio products. This applies to both access node and terminal devices of radio systems.

One aspect of the beamforming is to compute the eigenbeams. An eigenbeam can be understood as a directive beam focusing radio energy to a desired direction with desired amplification. Multiple eigenbeams may be computed to realize multiple spatially uncorrelated channels between a transmitter and receiver. Eigenvalue decomposition may be used to compute the eigenbeams. Efficient computation of the eigenbeams is an important factor.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect, there is provided an apparatus comprising means for performing: obtaining a channel matrix representing a radio channel between the apparatus and another apparatus; obtaining an initial eigenvector estimate; computing an intermediate eigenvector estimate based on the channel matrix and the initial eigenvector estimate; computing an error vector representing an error between the initial eigenvector estimate and the intermediate eigenvector estimate; computing a final eigenvector estimate based on the error vector and the intermediate eigenvector estimate; and determining beamforming coefficients based on the final eigenvector estimate and communicating with said another apparatus by using the beamforming coefficients.

In an embodiment, the means are configured to iterate obtaining the initial eigenvector estimate, computing the intermediate eigenvector estimate, computing the error vector, and computing the final eigenvector estimate, wherein said computing the final eigenvector estimate for an iteration comprises removing the error vector from the initial eigenvector estimate, the resulting eigenvector estimate serving as a new initial eigenvector estimate for a subsequent iteration or, after the last iteration, as an input to said determining the beamforming coefficients.

In an embodiment, the means are configured to compute at least two eigenvectors and wherein the number of iterations for computing the final eigenvector estimate is different for the at least two eigenvectors.

In an embodiment, the means are configured to: remove one or more components that are parallel to the final eigenvector estimate from the channel matrix; and perform obtaining the initial eigenvector estimate, computing the intermediate eigenvector estimate, computing the error vector, computing the final eigenvector estimate, and determining the beamforming coefficients, for a further eigenvector of the channel matrix from which the one or more components have been removed.

In an embodiment, the means are configured to obtain an error scaling factor, and to scale the error vector by the error scaling factor when computing the final eigenvector estimate.

In an embodiment, a value of the error scaling factor is changed between at least two consecutive iterations.

In an embodiment, the error scaling factor is based on a size of the channel matrix.

In an embodiment, the error scaling factor is based on an index of the eigenvector, wherein a first error scaling factor based on a first index is greater than or equal to a second error scaling value based on a second index, wherein the second index is greater than the first index.

In an embodiment, the error scaling factor is between 0 and 1.

In an embodiment, computing the intermediate eigenvector estimate comprises normalizing the initial eigenvector estimate by a maximum element of the initial eigenvector estimate.

In an embodiment, the normalizing is based on a maximum real value of the initial eigenvector estimate and/or a maximum imaginary value of the initial eigenvector estimate.

In an embodiment, the means are configured to normalize the final eigenvector estimate to a norm of the final eigenvector estimate.

According to an aspect, there is provided an apparatus comprising at least one processor; and at least one memory including computer program code, the at least one memory and computer program code configured to, with the at least one processor, cause the apparatus to perform: obtaining a channel matrix representing a radio channel between the apparatus and another apparatus; obtaining an initial eigenvector estimate for an eigenvector of the channel matrix; computing an intermediate eigenvector estimate based on the channel matrix and the initial eigenvector estimate; computing an error vector representing an error between the initial eigenvector estimate and the intermediate eigenvector estimate; computing a final eigenvector estimate based on the error vector and the intermediate eigenvector estimate; and determining beamforming coefficients based on the final eigenvector estimate and communicating with said another apparatus by using the beamforming coefficients According to an aspect, there is provided a method comprising: obtaining a channel matrix representing a radio channel between an apparatus and another apparatus; obtaining an initial eigenvector estimate for an eigenvector of the channel matrix; computing an intermediate eigenvector estimate based on the channel matrix and the initial eigenvector estimate; computing an error vector representing an error between the initial eigenvector estimate and the intermediate eigenvector estimate; computing a final eigenvector estimate based on the error vector and the intermediate eigenvector estimate; and determining beamforming coefficients based on the final eigenvector estimate and communicating with said another apparatus by using the beamforming coefficients.

In an embodiment, the means are configured to iterate obtaining the initial eigenvector estimate, computing the intermediate eigenvector estimate, computing the error vector, and computing the final eigenvector estimate, wherein said computing the final eigenvector estimate for an iteration comprises removing the error vector from the initial eigenvector estimate, the resulting eigenvector estimate serving as a new initial eigenvector estimate for a subsequent iteration or, after the last iteration, as an input to said determining the beamforming coefficients.

In an embodiment, the means are configured to compute at least two eigenvectors and wherein the number of iterations for computing the final eigenvector estimate is different for the at least two eigenvectors.

In an embodiment, the means are configured to: remove one or more components that are parallel to the final eigenvector estimate from the channel matrix; and perform obtaining the initial eigenvector estimate, computing the intermediate eigenvector estimate, computing the error vector, computing the final eigenvector estimate, and determining the beamforming coefficients, for a further eigenvector of the channel matrix from which the one or more components have been removed.

In an embodiment, an apparatus performing the method obtains an error scaling factor and scales the error vector by the error scaling factor when computing the final eigenvector estimate.

In an embodiment, a value of the error scaling factor is changed between at least two consecutive iterations.

In an embodiment, the error scaling factor is based on a size of the channel matrix.

In an embodiment, the error scaling factor is based on an index of the eigenvector, wherein a first error scaling factor based on a first index is greater than or equal to a second error scaling value based on a second index, wherein the second index is greater than the first index.

In an embodiment, the error scaling factor is between 0 and 1.

In an embodiment, an apparatus performing the method computes the intermediate eigenvector estimate by at least normalizing the initial eigenvector estimate by a maximum element of the initial eigenvector estimate.

In an embodiment, the normalizing is based on a maximum real value of the initial eigenvector estimate and/or a maximum imaginary value of the initial eigenvector estimate.

In an embodiment, an apparatus performing the method normalizes the final eigenvector estimate to a norm of the final eigenvector estimate.

According to an aspect, there is provided a computer program comprising instructions for causing an apparatus to at least perform: obtaining a channel matrix representing a radio channel between the apparatus and another apparatus; obtaining an initial eigenvector estimate for an eigenvector of the channel matrix; computing an intermediate eigenvector estimate based on the channel matrix and the initial eigenvector estimate; computing an error vector representing an error between the initial eigenvector estimate and the intermediate eigenvector estimate; computing a final eigenvector estimate based on the error vector and the intermediate eigenvector estimate; and determining beamforming coefficients based on the final eigenvector estimate and communicating with said another apparatus by using the beamforming coefficients.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a user terminal, a communication device, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
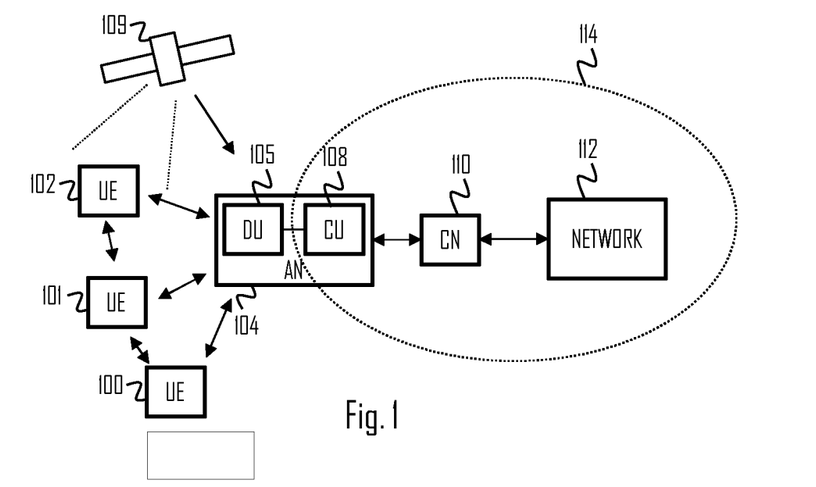
FIGS. 1 and 2 illustrate examples of simplified system scenario to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 to 102. The devices 100 to 102 are configured to be in a wireless connection on one or more communication channels with a node 104. The node 104 is further connected to a core network 110. In one example, the node 104 may be an access node such as (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 110 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one ore more external packet data networks, and to a mobile management entity (MME) or access mobility management function (AMF), for controlling access and mobility of the devices.

Exemplary embodiments of a device 100, 101, 102 are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 105) and non-real time functions being carried out in a centralized manner (in a central unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling via one or more satellite access nodes 109. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
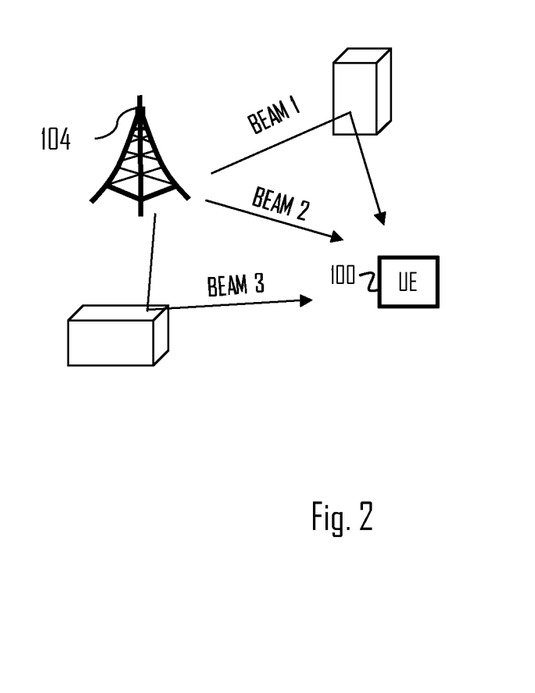

As described in Background, beamforming is commonly used in radio communication systems to either focus transmission power towards the intended recipient of signals or to focus reception antenna gain towards a transmitter in reception of the signals from the transmitter. As higher frequencies are taken into use, the importance of effective beamforming rises. Accurate computation of the correct beamforming coefficients on the basis of available channel information improves the efficiency of directing the energy towards a communication counterparty while reducing interference to other directions. FIG. 2 illustrates a common communication environment where a radio channel between a terminal device 100 and an access node 104 comprises one communication channel or multiple spatially orthogonal communication channels. The multiple channels may be realized by a direct path (beam 2) between the devices 100, 104 and via reflection of radio signals from various obstacles such as buildings (beams 1 and 3). Characteristics of the channel may be measured by transmitting a reference signal and processing the reference signal to construct a channel matrix representing the channel conditions. The channel matrix conventionally represents parallel sub-channels measured from signals received from multiple antennas of a receiver of the reference signal (device 100 or 104). Similarly, the reference signal may be transmitted via multiple transmission antennas from a transmitter (device 104 or 100). The channel matrix may be a channel covariance matrix, as described below. The computation of the channel matrix is as such known to the skilled person and is not discussed in greater detail herein. Instead, the following description focuses on how to efficiently compute the beamforming coefficients on the basis of the acquired channel matrix. It should be understood that the computation of the beamforming coefficients may be performed at any one or both of the devices 100, 104, and the communication need not to be between an access node 104 and a terminal device but between two terminal devices 100, 101 or generally between two peer devices.

Figure 3:
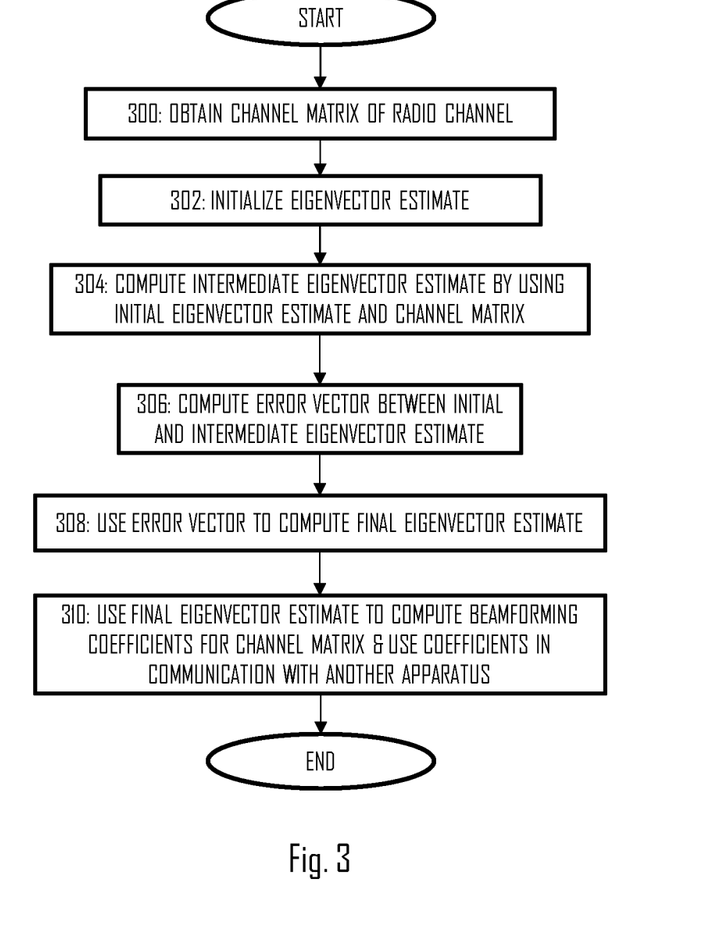
FIG. 3 illustrates an example of a process for computing beamforming coefficients according to an embodiment.

Referring to FIG. 3, a process for computing the beamforming coefficients comprises: obtaining (block 300) a channel matrix representing a radio channel between the apparatus and another apparatus; obtaining (block 302) an initial eigenvector estimate; computing (block 304) an intermediate eigenvector estimate based on the channel matrix and the initial eigenvector estimate; computing (block 306) an error vector representing an error between the initial eigenvector estimate and the intermediate eigenvector estimate; computing (block 308) a final eigenvector estimate based on the error vector and the intermediate eigenvector estimate; and determining (block 310) beamforming coefficients based on the final eigenvector estimate and communicating with said another apparatus by using the beamforming coefficients.

In the embodiment of FIG. 3, the error vector is employed in the computation of the final eigenvector estimate. The use of the error vector enables reduction of computational complexity, particularly in the embodiments described below where the procedure is iterative. This results from faster convergence to an optimal or acceptable value, which means less iterations. However, some improvement can be observed even when the number of iterations is one. The reduction in complexity realizes in reduced number of complex multiplications. While the computational complexity is reduced, estimation accuracy remains substantially similar to state-of-the-art methods.

Computation of the beamforming coefficients when the eigenvector(s) is/are known is known to the skilled person from the literature so the detailed description of that processing is omitted for the sake of conciseness.

The procedure of FIG. 3 may be used in a transmitter for computing the beamforming coefficients that define the direction(s) to which the transmitter shall focus transmitted radio beams towards a receiver. The procedure of FIG. 3 may be carried out in a receiver for focusing antenna gain towards a transmitter from which transmission (data or signalling information) is to be received. The transmitter may be the access node or a terminal device, and the receiver may equally be an access node or a terminal device. Accordingly, the procedure be used for communication between an access node and a terminal device or between two terminal devices or two access nodes. Even more generally, the procedure may be used for communication between two radio devices where one or both employ the procedure of FIG. 3. The procedure of FIG. 3 is described in the context of computing one eigenvector estimate but the principle can be expanded to computation of multiple eigenvector estimates on the basis of the channel matrix, as described in some embodiments below.

The channel matrix may be a channel covariance matrix, for example. The channel matrix may be a Hermitean matrix of size N×N. N may equal to the number of antennas in the apparatus that performs the procedure of FIG. 3. For example, N may be 4, 8, 16, or 32, or even higher. As known in the art, a Hermitean matrix is a square matrix that is equal to its own conjugate transpose.

Figure 4:
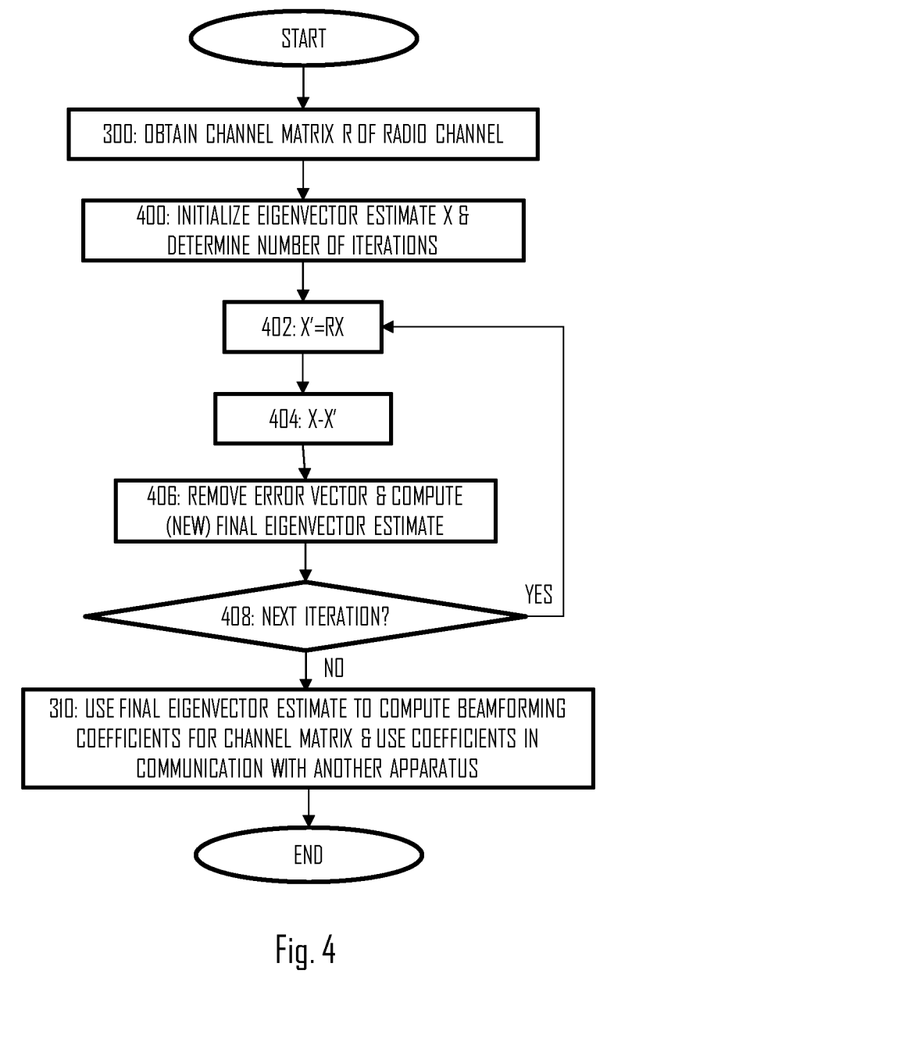
FIG. 4 illustrates an iterative method for computing the beamforming coefficients according to an embodiment.

FIG. 4 illustrates an embodiment where blocks 302 to 308 are iterated and the final eigenvector estimate is then computed after the last iteration. In the embodiment of FIG. 4, the following steps of FIG. 3 are iterated: obtaining the initial eigenvector estimate, computing the intermediate eigenvector estimate, computing the error vector, and computing the final eigenvector estimate. wherein said computing the final eigenvector estimate for an iteration comprises removing the error vector from the initial eigenvector estimate, the resulting eigenvector estimate serving as a new initial eigenvector estimate for a subsequent iteration or, after the last iteration, as an input to said determining the beamforming coefficients. FIG. 4 also combines some embodiments, as described below.

Let us then describe the iterative method for computing an eigenvector with reference to FIG. 4. The same reference numbers as in FIG. 3 represent the same or substantially similar functions or operations. Upon computing the channel matrix R on the basis of measuring the radio channel between the transmitter and the receiver, the apparatus performing the procedure initializes an eigenvector estimate to obtain the initial eigenvector estimate X in block 400. The initialization in block 400 may further comprise determining a number of iterations. The initial eigenvector estimate may be formed of a vector (column) of a Hadamard matrix or a vector (column) of a Fourier matrix, for example. Thereafter, the vector may be multiplied by the channel matrix to obtain the initial eigenvector estimate X for the first iteration.

In block 402, the initial eigenvector estimate is again multiplied by the channel matrix R to obtain the intermediate eigenvector estimate X'=RX. Thereafter, the error vector between the initial eigenvector estimate and the intermediate eigenvector estimate is computed in block 404 as X-X'. Thereafter, the error vector is subtracted from the initial eigenvector estimate X to compute a final eigenvector estimate for the first iteration (block 406). The computation of the final eigenvector estimate for the first iteration may be represented as X"=X'−(X-X') where X" is a new initial eigenvector estimate X for the following iteration.

In block 408, it is determined whether or not to carry out another iteration. Since it is the first in the example above and the number of iterations is greater than one, the process returns to block 402 to compute the new intermediate eigenvector estimate X', new error vector X-X', and the new final eigenvector estimate X". In this manner, the determined number of iterations is performed and, upon determining in block 408 that no more iterations shall be performed, the last version of the final eigenvector estimate is taken as an output for the computation of the beamforming coefficients in block 310. Some embodiments for post-processing the final eigenvector estimate are described below.

The number of iterations may have a predefined value to limit the computations and the time for computing the beamforming coefficients. Accordingly, the number of iterations can be determined beforehand in block 400. In other embodiments, the number of iterations may be a function of the value of the error vector. If the error vector is smaller (in its absolute or norm value) than a threshold, the iterations may stop. Otherwise, the iterations may be continued.

In an embodiment, the error vector is scaled by an error scaling factor before subtracting it from the initial eigenvector estimate to compute the final eigenvector estimate. From the perspective of the apparatus carrying out the respective embodiment of FIG. 3 or 4, the apparatus obtains an error scaling factor and scales the error vector by the error scaling factor when computing the final eigenvector estimate, e.g. before subtracting the error vector from the initial eigenvector estimate. Accordingly, the final eigenvector estimate X" may be represented as X"=X'−S(X-X') where S is the error scaling factor.

A technical effect of the error scaling factor is to improve the convergence of the algorithm towards an optimal eigenvector estimate.

In an embodiment, the error scaling factor is based on a size of the channel matrix, e.g. N. 8. The value of the error scaling factor may be between 0 and 1 in order to reduce oscillation of the resulting scaled error vector. The error scaling factor may remain constant during the iterations of the embodiment of FIG. 4.

Figure 5:
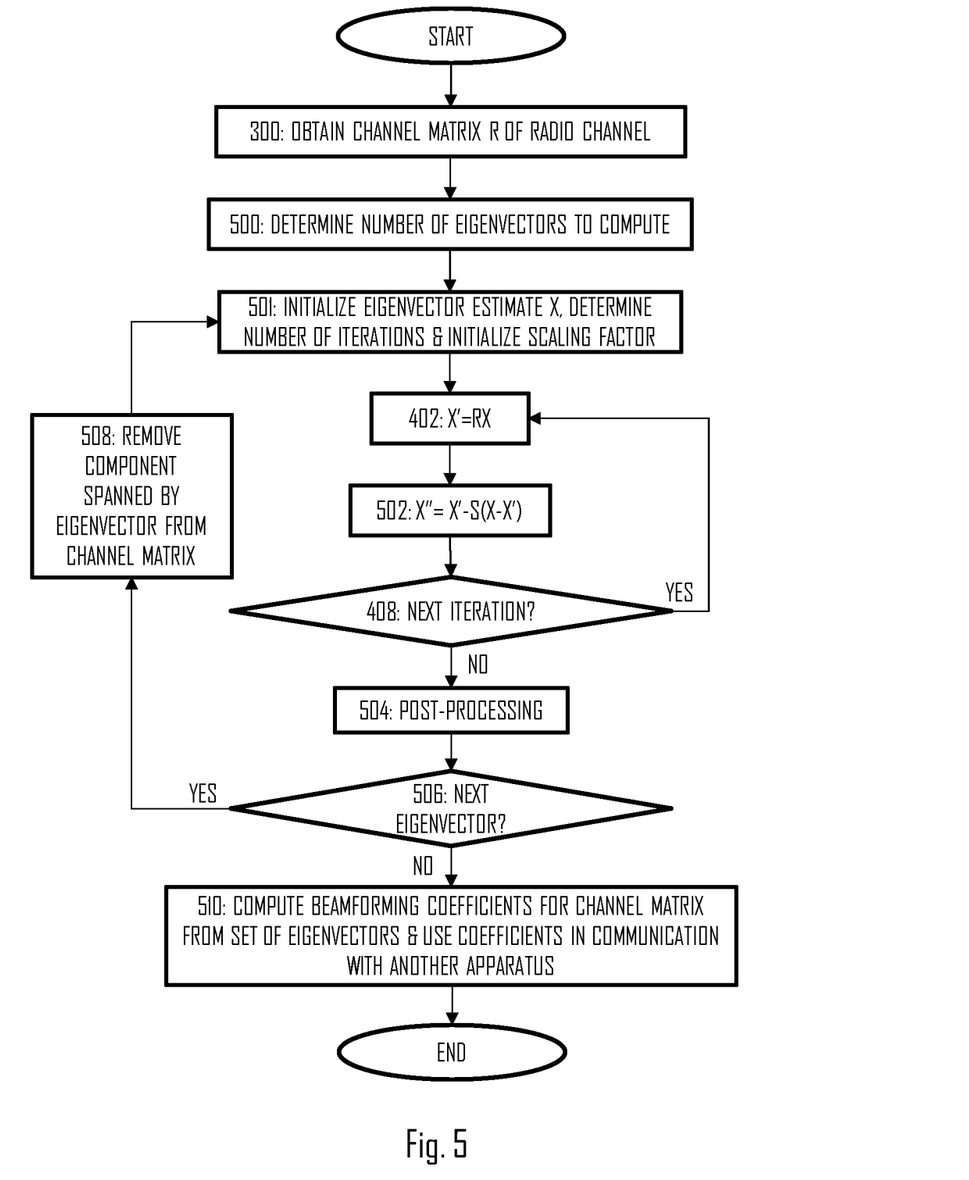
FIG. 5 illustrates an iterative method for computing multiple eigenvectors serving as a basis for the beamforming coefficients according to an embodiment.

In an embodiment of the procedure of FIG. 3 or 4, the procedures are repeated at least once to compute one or more additional and different eigenvectors. Accordingly, the procedure may be used to compute a plurality of spatially (substantially) orthogonal eigenbeams to realize multiple independent spatial channels between the transmitter and the receiver. FIG. 5 illustrates such an embodiment.

Referring to FIG. 5, upon computing the channel matrix R, a number of eigenvectors to compute is determined in block 500. The number of eigenvectors (spatial channels) to employ may depend on parameters of a connection between the transmitter and the receiver, e.g. parameters of a radio resource control (RRC) connection. The parameters may define limits to the number of spatial channels supported. The number of spatial channels may be limited by the number of antennas in the transmitter and/or receiver, a connection or service type (e.g. ultra-reliable low latency connection, URLLC, versus enhanced mobile broadband connection of 5G specifications).

Let us now assume that the number eigenvectors to be computed is greater than one. Then, the procedure may proceed to the first iteration in block 400, and blocks 400 and 402 may be carried out in the above-described manner. Thereafter, the error scaling factor may be determined, and the error vector may be scaled with the error scaling factor before subtracting the scaled error vector from the initial eigenvector estimate in block 502.

Then, the decision of the next iteration may be performed in block 408, and the determined number of iterations may be performed in the above-described manner. After the last iteration, the final eigenvector estimate resulting from the last iteration may be subjected to post-processing in block 504. The post-processing may include storing the final eigenvector estimate for the computation of the beamforming coefficients. Furthermore, the post-processing may include multiplying the final eigenvector estimate X" by the channel matrix as P=RX" and, further, computation of an eigenvalue as dependent on whether or not the post-processing is for the last eigenvector. If the post-processing is not for the last eigenvector to be computed, the post-processing further comprises computation of $T=P(X")^H$ and resulting computation of a sum of real values of diagonal elements of matrix P, the sum of diagonal elements of T representing the eigenvalue for the respective eigenvector. H in superscript denotes a Hermitean transpose operation. P can be defined as an intermediate vector used for computing T or directly the eigenvalue as $P^H X"$ for the respective eigenvector. The post-processing of block 504 may be included in the procedure of FIG. 4 as well. As an output of the post-processing, the estimated eigenvector and the respective eigenvalue are provided. In block 506, it is determined whether or not to compute another eigenvector.

Upon determining to compute another eigenvector in block 506, the process proceeds to block 508 where components corresponding to the final eigenvector estimate resulting from the post-processing in block 504 are removed from the channel matrix. This can be understood as removing the components of the computed eigenvector from the channel matrix, thus avoiding that the next iteration would result in the computation of the same or substantially similar eigenvector that has already been computed. Block 508 may include computing a new channel matrix as R-T, and the new channel matrix is used as the channel matrix R in the next iteration in blocks 400 and 402. In other words, a subspace spanned by the estimated eigenvector is then removed from the channel matrix. Thereafter, the next iteration is performed by using the channel matrix from which the one or more components have been removed.

In the last iteration, block 504 comprises computing the eigenvalue for the last eigenvector as real $(S^H X")$ where H in the superscript denotes the Hermitean transpose operation and real denotes taking a real value of the function inside the parentheses. Thereafter, the beamforming coefficients may be computed in block 510 for multiple eigenbeams for the purpose of transmission or reception of radio signals.

As described above, the procedure of FIG. 5 is now based on the iterative embodiment of FIG. 4. However, the procedure of FIG. 5 may in principle be simplified into a solution where only a single iteration per eigenvector is performed (block 408 omitted).

FIG. 5 also now illustrates the use of the error scaling factor, although the error scaling can be understood as a separate embodiment independent of the computation of the multiple eigenvectors.

In an embodiment using the iterative procedure of FIG. 4 for computing multiple eigenvectors, different numbers of iterations may be used for the different eigenvectors. The number of iterations may be based on an index of the eigenvector. For example, the number of iterations may be greater for the first eigenvector computed and smaller for one or more subsequent eigenvectors.

In the embodiments of FIG. 5 where multiple eigenvectors are computed by using the error scaling factor, the error scaling factor may be based on an index of the eigenvector. This means that the error scaling factor is different for at least two of the eigenvectors. In an embodiment, the error scaling factor is greater for the first eigenvector and smaller for one or more eigenvectors following the first eigenvector in the order of computing the eigenvectors. In other words, a first error scaling factor based on a first index is greater than or equal to a second error scaling value based on a second index, wherein the second index is greater than the first index.

In an embodiment, the error scaling factor is a dyadic rational which means that the error scaling factor is expressible as a fractional number where a denominator is a power of two, e.g. ½, ¼, ⅛, 1/16, etc. An example of a sequence of error correction factors is {0.25, 0.25, 0.125, 0.125, 0.125, 0.125}. Accordingly, the error scaling factor is 0.25 for the first two eigenvectors and 0.125 for the subsequent eigenvectors. The values of the error scaling factors may thus be dependent on the number of eigenvectors to be computed (e.g. the number of antennas in the transmitter and/or receiver) and the index of the eigenvector currently under computation. In other words, the error scaling factor may be dependent on the size of the channel matrix.

In another embodiment, the error scaling factor is changed between at least two iterations when computing an eigenvector (FIG. 4 or the inner iteration cycle of FIG. 5). For example, the error scaling factor may be greater for a first iteration and reduced for at least one following iteration.

It is possible that the values of the elements in the matrices computed during the iterations rise, thereby increasing a dynamic range of the values. In order to limit the dynamic range, normalization of the initial eigenvector estimate may be carried out during the iterations. Conventionally, the normalization has been performed with respect to a vector norm, e.g. the norm of vector X. One solution for computing a normalization function $f_{norm}$ based on the vector norm is $f_{norm}=1/\sqrt{x^H x}$ where H denotes a Hermitean transpose operation. Thereafter, the normalization may be performed by multiplying the vector X by $f_{norm}$. However, computation of the norm in this manner is computationally complex because of the number of multiplications and the square root function.

Figure 6:
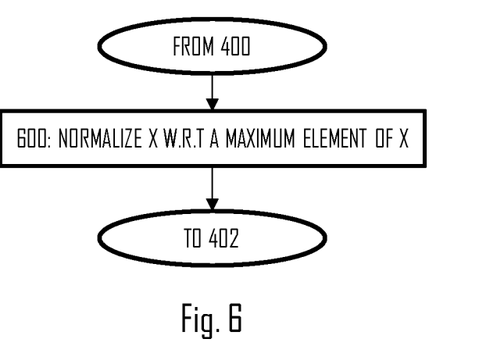
FIGS. 6 and 7 illustrate embodiments of modules for performing normalization according to some embodiments.

FIG. 6 illustrates an embodiment for performing the normalization in the procedure of FIG. 4 or 5 and between blocks 400 and 402. Instead of computing the vector norm, the initial eigenvector estimate is normalized in block 600 to a maximum element of the initial eigenvector estimate. In an embodiment, the maximum element is a maximum real value of the initial eigenvector estimate, in an embodiment, the maximum element is a maximum imaginary value of the initial eigenvector estimate. In an embodiment, the maximum element is a sum of the maximum real value and the maximum imaginary value. Accordingly, the normalization function may be any one of the functions below:

$$f(X)=1/(\max(\text{real}(X)))$$

$$f(X)=1/(\max(\text{imag}(X)))$$

$$f(X)=1/(\max(\text{real}(X))+\max(\text{imag}(X)))$$

These embodiments can be understood as performing the normalization to a value that is derivable from the initial eigenvector estimate with a search function or a sorting function to find the maximum element, thus avoiding the complex multiplication operations. Accordingly, the number of operations is significantly reduced. In an embodiment, the search or sorting function is supplemented by the sum function, as indicated above. Still, the sum function is less complex function than the multiplication. With such a simple normalization, acceptable dynamic range may be maintained during the iterations with low computational complexity.

Figure 7:
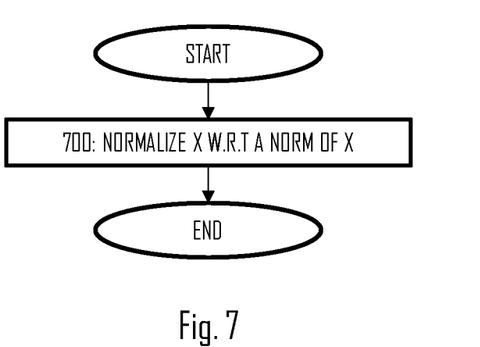

In an embodiment, the normalization may be performed in the post-processing in block 504. FIG. 7 illustrates this normalization. Since the post-processing is performed only once per eigenvector, this normalization may be made in block 700 with respect to the vector norm and follow the Equation $f_{acc}=1/\sqrt{x^H x}$. In another embodiment, the normalization of FIG. 7 is performed in block 310 or 510.

In an embodiment, both normalizations of FIGS. 6 and 7 are performed, the simplified normalization of FIG. 6 during the iterations of computing an eigenvector according to FIG. 4 or 5, and the more complex normalization in the post-processing or before computing the beamforming coefficients in block 310 or 510.

Figure 8:
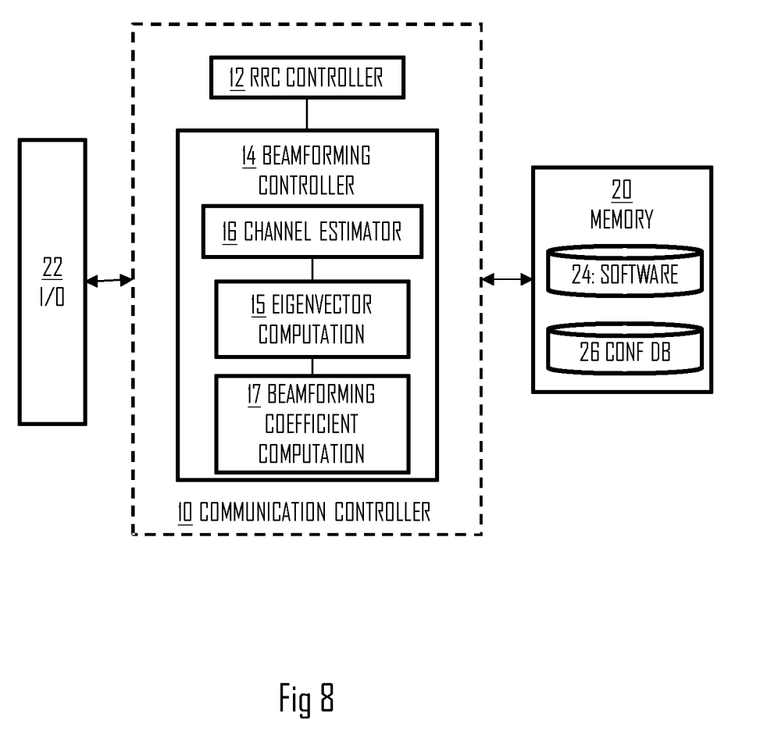
FIG. 8 illustrates a simplified example of an apparatus applying some embodiments of the invention.

FIG. 8 illustrates an apparatus comprising a processing circuitry, such as at least one processor, and at least one memory 20 including a computer program code (software) 24, wherein the at least one memory and the computer program code (software) are configured, with the at least one processor, to cause the apparatus to carry out the process of FIG. 3 or any one of its embodiments described above. The apparatus may be for the above-described transmitter or receiver, such as a terminal device or an access node. The apparatus may be a circuitry or an electronic device realizing some embodiments of the invention in the respective device. The apparatus carrying out the above-described functionalities may thus be comprised in such a device, e.g. the apparatus may comprise a circuitry such as a chip, a chipset, a processor, a micro controller, or a combination of such circuitries for the respective device. The at least one processor or a processing circuitry may realize a communication controller 10 controlling radio communications with the cellular network infrastructure and/or with other terminal devices or peer devices of the transmitter. The communication controller may be configured to establish and manage radio connections and transfer of data over the radio connections, including transmission by using the above-described modulation method.

In embodiments where the transmitter is the terminal device, the communication controller may comprise a radio resource control (RRC) controller 12 configured to manage RRC connections with other radio devices, as described above. The features of RRC connections are described in greater detail in 3GPP specifications for LTE and 5G, for example. In other networks, a similar radio controller may be implemented for managing connections with other radio devices.

The communication controller may further comprise a beamforming controller 14 configured to manage beamforming parameters of the apparatus. The beamforming controller 14 may operate under the control of the RRC controller 12 and, for example, receive as inputs some parameters used in the beamforming. An example of such a parameter is the number of eigenvectors to compute. The beamforming controller may comprise a channel estimator 16 configured to compute the channel matrix R according to the state of the art. The beamforming controller may further comprise an eigenvector computation module 15 configured to compute one or more eigenvectors on the basis of the channel matrix, e.g. perform blocks 302 to 308 of FIG. 3 or respective elements in the embodiments. The beamforming controller may further comprise a beamforming coefficient computation module 17 configured to carry out block 310 or 510 to realize the beamforming to the desired direction from the apparatus during the communications.

The memory 20 may be implemented using any suitable data storage technology, such as semiconductor-based memory devices, flash memory, magnetic memory devices and systems, optical memory devices and systems, fixed memory and removable memory. The memory 20 may comprise a database 26 storing the error scaling factors, for example. The memory 20 may further store a data buffer 28 for data subjected to the beamforming with the beamforming coefficients.

The apparatus may further comprise a communication interface 22 comprising hardware and/or software for providing the apparatus with radio communication capability with one or more access nodes, as described above. The communication interface 22 may include, for example, an antenna, one or more radio frequency filters, a power amplifier, and one or more frequency converters. The communication interface 22 may comprise hardware and software needed for realizing the radio communications over the radio interface, e.g. according to specifications of an LTE or 5G radio interface.

The apparatus of FIG. 8 may further comprise an application processor operating as a source or a sink for application data to be communicated by using the beamforming coefficients. The application data may relate to a primary purpose of an apparatus comprising the transmitter. Such an apparatus may be a mobile phone, a tablet computer, a smart watch, or another personal communication device, or it may be a sensor device or another industrial device with cellular communication capability. Accordingly, the application data may comprise various data. In a case of the apparatus being comprised in the access node, the application processor may be omitted.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising means for performing:
   obtaining a channel matrix representing a radio channel between the apparatus and another apparatus;
   obtaining an initial eigenvector estimate;
   computing an intermediate eigenvector estimate based on the channel matrix and the initial eigenvector estimate;
   computing an error vector representing an error between the initial eigenvector estimate and the intermediate eigenvector estimate;
   computing a final eigenvector estimate based on the error vector and the intermediate eigenvector estimate; and
   determining beamforming coefficients based on the final eigenvector estimate and communicating with said another apparatus by using the beamforming coefficients.

2. The apparatus of claim 1, wherein the means are configured to iterate obtaining the initial eigenvector estimate, computing the intermediate eigenvector estimate, computing the error vector, and computing the final eigenvector estimate, wherein said computing the final eigenvector estimate for an iteration comprises removing the error vector from the initial eigenvector estimate, the resulting eigenvector estimate serving as a new initial eigenvector estimate for a subsequent iteration or, after the last iteration, as an input to said determining the beamforming coefficients.

3. The apparatus of claim 2, wherein the means are configured to compute at least two eigenvectors and wherein the number of iterations for computing the final eigenvector estimate is different for the at least two eigenvectors.

4. The apparatus of claim 1, wherein the means are configured to:
   remove one or more components that are parallel to the final eigenvector estimate from the channel matrix; and
   perform obtaining the initial eigenvector estimate, computing the intermediate eigenvector estimate, computing the error vector, computing the final eigenvector estimate, and determining the beamforming coefficients, for a further eigenvector of the channel matrix from which the one or more components have been removed.

5. The apparatus of claim 1, wherein the means are configured to obtain an error scaling factor, and to scale the error vector by the error scaling factor when computing the final eigenvector estimate.

6. The apparatus of claim 5, wherein a value of the error scaling factor is changed between at least two consecutive iterations.

7. The apparatus of claim 5, wherein the error scaling factor is based on a size of the channel matrix.

8. The apparatus of claim 5, wherein the error scaling factor is based on an index of the eigenvector, wherein a first error scaling factor based on a first index is greater than or equal to a second error scaling value based on a second index, wherein the second index is greater than the first index.

9. The apparatus of claim 5, wherein the error scaling factor is between 0 and 1.

10. The apparatus of claim 1, wherein computing the intermediate eigenvector estimate comprises normalizing the initial eigenvector estimate by a maximum element of the initial eigenvector estimate.

11. The apparatus of claim 10, wherein the normalizing is based on a maximum real value of the initial eigenvector estimate and/or a maximum imaginary value of the initial eigenvector estimate.

12. The apparatus of claim 1, wherein the means are configured to normalize the final eigenvector estimate to a norm of the final eigenvector estimate.

13. An apparatus, comprising:
at least one processor; and
at least one memory including computer program code, the at least one memory and computer program code configured to, with the at least one processor, cause the apparatus to perform:
obtaining a channel matrix representing a radio channel between the apparatus and another apparatus;
obtaining an initial eigenvector estimate for an eigenvector of the channel matrix;
computing an intermediate eigenvector estimate based on the channel matrix and the initial eigenvector estimate;
computing an error vector representing an error between the initial eigenvector estimate and the intermediate eigenvector estimate;
computing a final eigenvector estimate based on the error vector and the intermediate eigenvector estimate; and
determining beamforming coefficients based on the final eigenvector estimate and communicating with said another apparatus by using the beamforming coefficients.

14. The apparatus of claim 13, wherein the at least one memory and computer program code are further configured, with the at least one processor, to cause the apparatus to iterate obtaining the initial eigenvector estimate, computing the intermediate eigenvector estimate, computing the error vector, and computing the final eigenvector estimate, wherein said computing the final eigenvector estimate for an iteration comprises removing the error vector from the initial eigenvector estimate, the resulting eigenvector estimate serving as a new initial eigenvector estimate for a subsequent iteration or, after the last iteration, as an input to said determining the beamforming coefficients.

15. The apparatus of claim 14, wherein the at least one memory and computer program code are further configured, with the at least one processor, to cause the apparatus to compute at least two eigenvectors and wherein the number of iterations for computing the final eigenvector estimate is different for the at least two eigenvectors.

16. The apparatus of claim 13, wherein the at least one memory and computer program code are further configured, with the at least one processor, to cause the apparatus to:
remove one or more components that are parallel to the final eigenvector estimate from the channel matrix; and
perform obtaining the initial eigenvector estimate, computing the intermediate eigenvector estimate, computing the error vector, computing the final eigenvector estimate, and determining the beamforming coefficients, for a further eigenvector of the channel matrix from which the one or more components have been removed.

17. The apparatus of claim 13, wherein the at least one memory and computer program code are further configured, with the at least one processor, to cause the apparatus to obtain an error scaling factor, and to scale the error vector by the error scaling factor when computing the final eigenvector estimate.

18. The apparatus of claim 17, wherein a value of the error scaling factor is changed between at least two consecutive iterations.

19. A method, comprising:
obtaining a channel matrix representing a radio channel between an apparatus and another apparatus;
obtaining an initial eigenvector estimate for an eigenvector of the channel matrix;
computing an intermediate eigenvector estimate based on the channel matrix and the initial eigenvector estimate;
computing an error vector representing an error between the initial eigenvector estimate and the intermediate eigenvector estimate;
computing a final eigenvector estimate based on the error vector and the intermediate eigenvector estimate; and
determining beamforming coefficients based on the final eigenvector estimate and communicating with said another apparatus by using the beamforming coefficients.

20. A computer program embodied on a non-transitory computer-readable medium, said computer program comprising instructions encoded on said non-transitory computer-readable medium that, when executed on an apparatus, cause the apparatus to at least perform:
obtaining a channel matrix representing a radio channel between the apparatus and another apparatus;
obtaining an initial eigenvector estimate for an eigenvector of the channel matrix;
computing an intermediate eigenvector estimate based on the channel matrix and the initial eigenvector estimate;
computing an error vector representing an error between the initial eigenvector estimate and the intermediate eigenvector estimate;
computing a final eigenvector estimate based on the error vector and the intermediate eigenvector estimate; and
determining beamforming coefficients based on the final eigenvector estimate and communicating with said another apparatus by using the beamforming coefficients.

* * * * *